US010560835B2

(12) United States Patent
Yamamoto et al.

(10) Patent No.: US 10,560,835 B2
(45) Date of Patent: Feb. 11, 2020

(54) LIGHTING SYSTEM, SETTING DEVICE, AND PAIRING METHOD FOR LIGHTING SYSTEM

(71) Applicant: Panasonic Intellectual Property Management Co., Ltd., Osaka (JP)

(72) Inventors: Tomokazu Yamamoto, Osaka (JP); Tatsumi Setomoto, Osaka (JP); Tamotsu Ando, Osaka (JP); Kohji Hiramatsu, Osaka (JP); Hajime Ozaki, Osaka (JP); Kentaro Yamauchi, Hyogo (JP); Shigeo Nakamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/039,390

(22) Filed: Jul. 19, 2018

(65) Prior Publication Data

US 2019/0045347 A1 Feb. 7, 2019

(30) Foreign Application Priority Data

Aug. 4, 2017 (JP) .................................. 2017-151922

(51) Int. Cl.
| | |
|---|---|
| *H04W 52/36* | (2009.01) |
| *H04W 8/00* | (2009.01) |
| *H04W 52/32* | (2009.01) |
| *H05B 37/02* | (2006.01) |

(52) U.S. Cl.
CPC ......... *H04W 8/005* (2013.01); *H04W 52/322* (2013.01); *H04W 52/367* (2013.01); *H05B 37/0272* (2013.01)

(58) Field of Classification Search
CPC . H04W 8/005; H04W 52/367; H04W 52/322; H04W 52/36; H04W 52/50; H04W 52/386; H05B 37/0272; H05B 37/02; H05B 37/0245; H04B 10/116; H04L 67/12

See application file for complete search history.

(56) References Cited

U.S. PATENT DOCUMENTS

2014/0070707 A1\* 3/2014 Nagazoe .............. H04B 10/116
315/151

FOREIGN PATENT DOCUMENTS

| JP | 2009-231013 A | 10/2009 |
|---|---|---|
| JP | 2016-091637 A | 5/2016 |
| JP | 2016-103372 A | 6/2016 |
| JP | 2016-143599 A | 8/2016 |

(Continued)

*Primary Examiner* — Dady Chery
(74) *Attorney, Agent, or Firm* — McDermott Will & Emery LLP

(57) ABSTRACT

Luminaires in a lighting system have mutually different addresses. A setting device includes a communication unit that transmits an address request signal at a first transmission power level and a control unit that determines whether a total number of the addresses transmitted from one or more of the luminaires in response to receiving the address request signal is within a target range. The control unit instructs the communication unit to transmit the address request signal at a transmission power level different from the first transmission power level when the total number of the addresses is outside the target range, and executes pairing of the one or more of the luminaires that responded to the address request signal with a wireless controller when the total number of the addresses is within the target range.

15 Claims, 17 Drawing Sheets

(56) References Cited

FOREIGN PATENT DOCUMENTS

| JP | 2017-016985 A | 1/2017 |
|----|---------------|--------|
| WO | 2016067713 A1 | 5/2016 |

\* cited by examiner

EMBODIMENT 1

| REQUEST (ATTEMPT #) | RADIO TRANSMISSION POWER (mW) | TOTAL # OF ADDRESSES | WITHIN TARGET RANGE? (TARGET # = 1 TO 3) |
|---|---|---|---|
| 1 | 20 | 30 | × |
| 2 | 10 | 29 | × |
| 3 | 1 | 10 | × |
| 4 | 0.5 | 5 | × |
| 5 | 0.3 | 3 | ○ |

FIG. 9

VARIATION 1 OF EMBODIMENT 1

| REQUEST (ATTEMPT #) | RADIO TRANSMISSION POWER (mW) | TOTAL # OF ADDRESSES | WITHIN TARGET RANGE? (TARGET # = 1 TO 3) |
|---|---|---|---|
| 1 | 0.1 | 0 | × |
| 2 | 0.2 | 0 | × |
| 3 | 0.3 | 3 | ○ |

FIG. 10

VARIATION 2 OF EMBODIMENT 1

| REQUEST (ATTEMPT #) | RADIO TRANSMISSION POWER (mW) | TOTAL # OF ADDRESSES | WITHIN TARGET RANGE? (TARGET # = 1 TO 3) |
|---|---|---|---|
| 1 | 10 | 30 | × |
| 2 | 0.1 | 0 | × |
| 3 | 1 | 10 | × |
| 4 | 0.2 | 0 | × |
| 5 | 0.5 | 5 | × |
| 6 | 0.3 | 3 | ○ |

VARIATION 3 OF EMBODIMENT 1

| REQUEST (ATTEMPT #) | RADIO TRANSMISSION POWER (mW) | TOTAL # OF ADDRESSES | WITHIN TARGET RANGE? (TARGET # = 1 TO 3) |
|---|---|---|---|
| 1 | 0.3 | 3 | ◯ |

EMBODIMENT 2

| REQUEST (ATTEMPT #) | RADIO TRANSMISSION POWER (mW) | TOTAL # OF ADDRESSES | WITHIN TARGET RANGE? (TARGET # = 1 TO 3) |
|---|---|---|---|
| 1 | 0.3 | 4 | × |
| 2 | 0.2 | 2 | ○ |

VARIATION OF EMBODIMENT 2

VARIATION OF EMBODIMENT 2

| REQUEST (ATTEMPT #) | RADIO TRANSMISSION POWER (mW) | TOTAL # OF ADDRESSES | WITHIN TARGET RANGE? (TARGET # = 1 TO 3) |
|---|---|---|---|
| 1 | 0.3 | 4 | × |
| 2 | 0.2 | 3 | ○ |

VARIATION OF EMBODIMENT 3

(a)

RECORD:
• TARGET # = NO MORE THAN 3
• RADIO TRANSMISSION POWER = 0.3 mW,
  TOTAL # OF ADDRESSES = 4; NOT WITHIN TARGET RANGE
• RADIO TRANSMISSION POWER = 0.2 mW,
  TOTAL # OF ADDRESSES = 3; WITHIN TARGET RANGE

⇩ UPDATE EQUATION USING VALUES FROM RECORD (b)

FIG. 22

EMBODIMENT 4

| REQUEST (ATTEMPT #) | RADIO TRANSMISSION POWER (mW) | TOTAL # OF ADDRESSES | WITHIN TARGET RANGE? (TARGET # = 1 TO 3) |
|---|---|---|---|
| 1 | 1 | 5 | × |
| 2 | 0.5 | 2 | ○ |

LIGHTING SYSTEM, SETTING DEVICE, AND PAIRING METHOD FOR LIGHTING SYSTEM

CROSS REFERENCE TO RELATED APPLICATION

This application claims the benefit of priority of Japanese Patent Application Number 2017-151922 filed on Aug. 4, 2017, the entire content of which is hereby incorporated by reference.

BACKGROUND

1. Technical Field

The present disclosure relates to a setting device for executing pairing of a luminaire and a controller, a lighting system including such a setting device, and a pairing method for a lighting system.

2. Description of the Related Art

Conventionally, a lighting system including a plurality of luminaires and a controller that communicates with the plurality of luminaires is known (for example, see Japanese Unexamined Patent Application Publication No. 2017-16985). With this type of lighting system, the pairing setting operation is performed between each of the luminaires and the controller using a setting device after the plurality of luminaires and the controller have been installed on, for example, a structure of a building.

SUMMARY

However, with the conventional lighting system, there are cases when the pairing setting operation for the luminaires and the controller using the setting device is significantly laborious.

In view of this, the present disclosure has an object to provide, for example, a lighting system with which the pairing setting operation for the luminaires and the controller can be performed efficiently.

In one aspect, a lighting system according to the present disclosure includes: a plurality of luminaires; a wireless controller that wirelessly communicates with the plurality of luminaires; and a setting device that wirelessly communicates with the plurality of luminaires. The plurality of luminaires have mutually different addresses. The setting device includes a communication unit configured to transmit an address request signal at a first transmission power level, and a control unit configured to determine whether a total number of the addresses transmitted from one or more of the plurality of luminaires in response to receiving the address request signal is within a target range. The control unit is configured to instruct the communication unit to transmit the address request signal at a second transmission power level different from the first transmission power level when the total number of the addresses is outside the target range, and execute pairing of the one or more of the plurality of luminaires that responded to the address request signal with the wireless controller when the addresses is within the target range.

In one aspect, a setting device according to the present disclosure executes pairing of a plurality of luminaires having mutually different addresses with a wireless controller, and includes: a communication unit configured to wirelessly transmit an address request signal at a first transmission power level; and a control unit configured to determine whether a total number of the addresses transmitted from one or more of the plurality of luminaires in response to receiving the address request signal is within a target range. The control unit is configured to instruct the communication unit to transmit the address request signal at a second transmission power level different from the first transmission power level when the total number of the addresses is outside the target range, and execute pairing of the one or more of the plurality of luminaires that responded to the address request signal with the wireless controller when the total number of the addresses is within the target range.

In one aspect, a pairing method, according to the present disclosure, for a lighting system including a plurality of luminaires having mutually different addresses, a wireless controller that wirelessly communicates with the plurality of luminaires, and a setting device that wirelessly communicates with the plurality of luminaires, includes: transmitting, by the setting device, an address request signal at a first transmission power level; transmitting, by one or more of the plurality of luminaires in response to receiving the address request signal, the address of the one or more of the plurality of luminaires to the setting device; when a total number of the addresses transmitted is outside a target range, transmitting, by the setting device, the address request signal at a second transmission power level different from the first transmission power level, and when the total number of the addresses transmitted is within the target range, instructing, by the setting device, the one or more of the plurality of luminaires that responded to the address request signal to pair with the wireless controller; and executing, by the one or more of the plurality of luminaires instructed to pair with the wireless controller, the pairing with the wireless controller.

In the lighting system, the pairing setting operation for the luminaires and the controller can be performed efficiently.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 9 illustrates one example of radio transmission power levels and total numbers of addresses according to Variation 1 of Embodiment 1;

FIG. 10 illustrates one example of radio transmission power levels and total numbers of addresses according to Variation 2 of Embodiment 1;

FIG. 22 illustrates one example of radio transmission power levels and total numbers of addresses in a lighting system according to Embodiment 4.

DETAILED DESCRIPTION OF THE EMBODIMENTS

Figure 1:
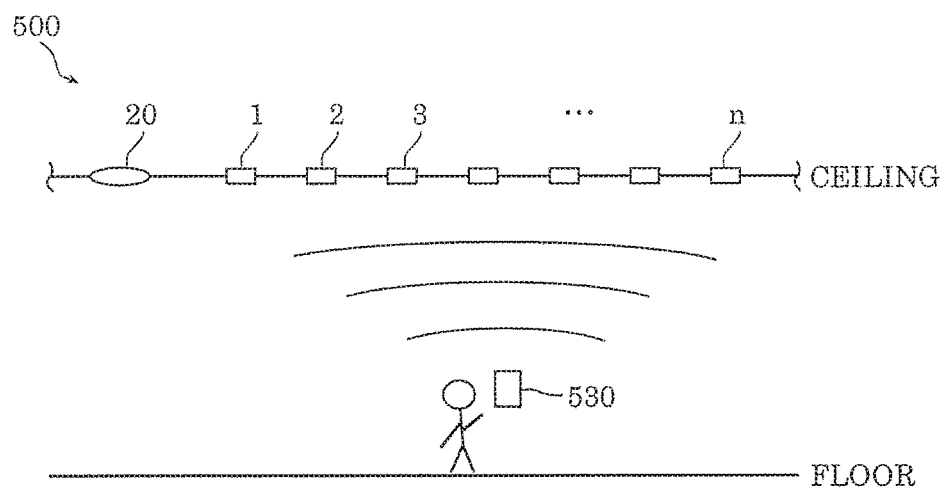
FIG. 1 is a diagram of a lighting system according to a comparative example.

First, before the description of the embodiments, lighting system 500 according to a comparative example will be described. FIG. 1 is a diagram of lighting system 500 according to a comparative example.

Lighting system 500 according to the comparative example includes a plurality of luminaires 1, 2, 3 ... n (n is a natural number greater than 3), wireless controller 20 that wirelessly communicates with luminaires 1 through n, and setting device 530 that wirelessly communicates with luminaires 1 through n. Conceivably, over 100 luminaires 1 through n may be installed on a structure of a building, such as a ceiling.

Immediately after luminaires 1 through n are installed, luminaires 1 through n and wireless controller 20 are not yet paired. Accordingly, there is a need to perform a pairing setting operation for luminaires 1 through n and wireless controller 20 so as to be able to control the lighting of luminaires 1 through n via wireless controller 20. Note that pairing means the devices that are to communicate with each other store each other's address, and a pairing setting operation includes steps required to complete the pairing after installing the luminaires, etc., on the building structure.

For example, as illustrated in FIG. 1, when performing the pairing setting operation, an operator uses setting device 530 to simultaneously send request signals requesting luminaires 1 through n to transmit their addresses. Having received this signal, each luminaire 1 through n then transmits its address to setting device 530. Next, the operator uses setting device 530 to select one of the addresses transmitted from luminaires 1 through n, and causes the luminaire corresponding to the selected address to blink on and off. This allows the operator to ascertain the relation between the selected luminaire address and the position of the luminaire in the building. After the two have been associated on setting device 530, the operator performs the pairing of the luminaire and the wireless controller.

However, when transmitting the request signal to the plurality of luminaires 1 though n, when the request signal reaches luminaire n located far away from setting device 530, the number transmitted address increases, whereby it may be difficult to accurately ascertain the relation between and the address of the luminaire and the position of the blinking luminaire. For example, in order to check the location of a far away luminaire that is blinking on and off, the operator must move to the location of the far away luminaire, which is significantly laborious.

The lighting system, etc., according to the following embodiments are configured as described below, and make it possible to efficiently perform the pairing setting operation for luminaires 1 through n with wireless controller 20.

The following describes exemplary embodiments of the lighting system, setting device, and pairing method for the lighting system according to the present disclosure with reference to the drawings. Each of the embodiments described below is merely one specific example of the present disclosure. The numerical values, shapes, materials, elements, arrangement and connection of the elements, etc., indicated in the following embodiments are given merely by way of illustration and are not intended to limit the present disclosure. Therefore, among elements in the following embodiments, those not recited in any one of the independent claims defining the broadest concept of the present disclosure are described as optional elements. Note that the figures are schematic illustrations and are not necessarily precise depictions. Moreover, in the figures, elements that are essentially the same share like reference signs. Accordingly, duplicate description is omitted or simplified.

Embodiment 1

1-1. Overall Configuration of Lighting System

Figure 2:
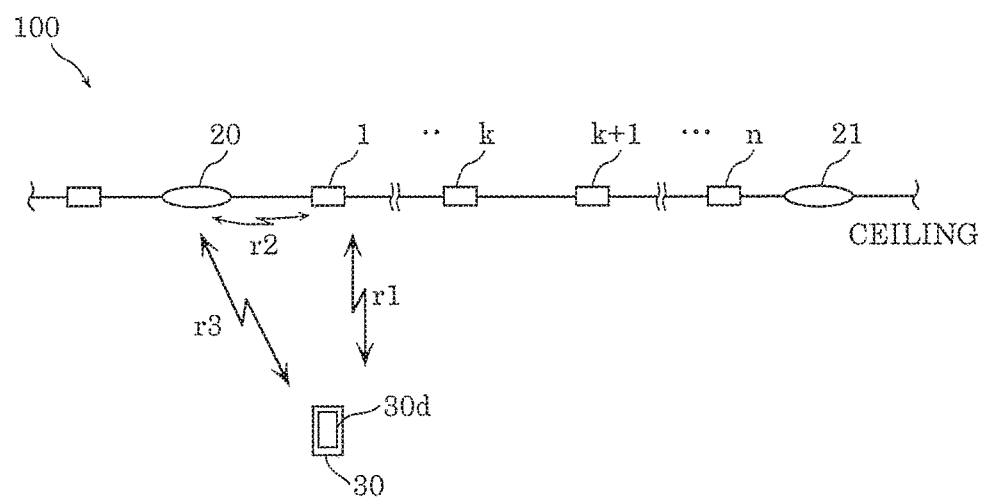
FIG. 2 is a diagram illustrating a luminaire, wireless controller, and setting device included in a lighting system according to Embodiment 1.

The overall configuration of lighting system 100 according to Embodiment 1 will be described with reference to FIG. 2. FIG. 2 is a diagram of lighting system 100.

Lighting system 100 includes a plurality of luminaires 1 ... k, k+1 ... n (k is a natural number; n is a natural number greater than k+1); a plurality of wireless controllers 20 and 21; and setting device 30. Conceivably, over 100 luminaires 1 through n may be installed on a structure of a building, such as a ceiling.

Luminaires 1 through n and setting device 30 are capable of communicating over radio r1. Examples of communication schemes used over radio r1 include specified low power radio that uses a frequency in the 920 MHz or 2.4 GHz band, Zigbee®, Bluetooth®, and WiFi®.

Luminaires 1 through n and wireless controllers 20 and 21 are capable of communicating over radio r2. Examples of communication schemes used over radio r2 are the same as those for radio r1.

Setting device 30 and wireless controllers 20 and 21 are capable of communicating over radio r3. Examples of communication schemes used over radio r3 are the same as those for radio r1.

Note that lighting system 100 may include a superordinate controller that collectively includes wireless controllers 20 and 21, and the superordinate controller and setting device 30 may be capable of communicating over radio r3. Moreover, other than over radio r1, setting device 30 may be capable of communicating with luminaire 1 via infrared communication, for example.

1-2. Lighting System Configuration

Figure 3:
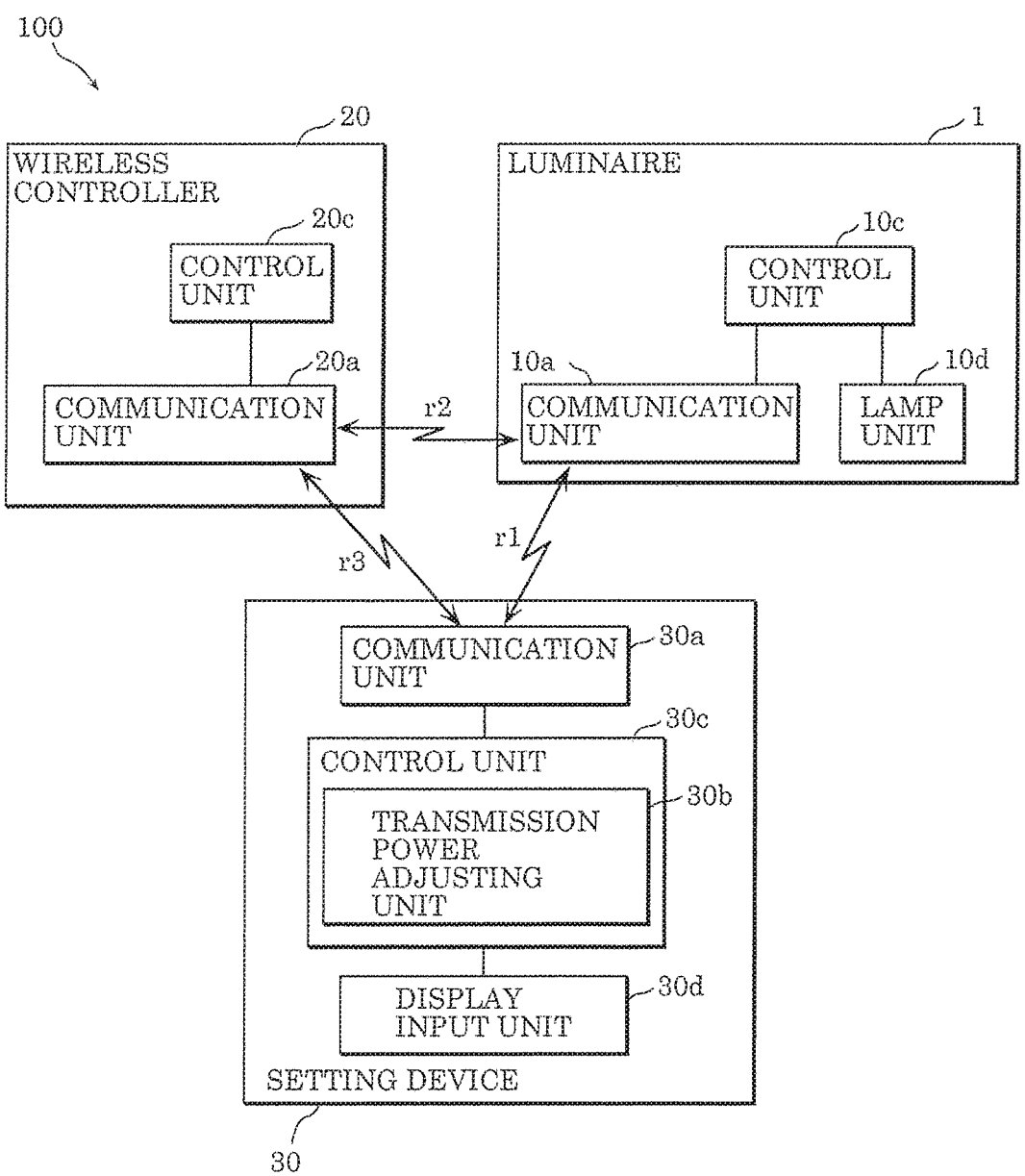
FIG. 3 is a block diagram illustrating the configuration of a lighting system according to Embodiment 1.

The configuration of lighting system 100 will be described with reference to FIG. 3. FIG. 3 is a block diagram illustrating the configuration of lighting system 100. Hereinafter, the description will reference luminaire 1 as a representative luminaire from among luminaires 1 through n. Moreover, the description will reference wireless controller 20 as a representative wireless controller from among wireless controllers 20 and 21.

Luminaire 1 is, for example, a light emitting diode (LED) light. Luminaire 1 includes communication unit 10a, lamp unit 10d, and control unit 10c connected to communication unit 10a and lamp unit 10d.

Lamp unit 10d includes a plurality of light sources, such as light-emitting diodes that emit, for example, white, red, green, and/or blue light.

Control unit 10c includes, for example, a central processing unit (CPU), random access memory (RAM), and read-only memory (ROM). An identifier that identifies luminaire 1, such as a media access control (MAC) address, is stored in control unit 10c. After pairing is complete, for example, control unit 10c controls the operating state of lamp unit 10d based on an instruction transmitted from wireless controller 20.

Communication unit 10a includes, for example, an antenna and a wireless module. Communication unit 10a communicates with setting device 30 over radio r1 and communicates with wireless controller 20 over radio r2. Communication unit 10a receives an address request signal transmitted by setting device 30. An address request signal is a signal requesting transmission of an address stored in luminaires 1 through n to setting device 30.

Upon communication unit 10a receiving the address request signal, control unit 10c transmits the address of luminaire 1 to setting device 30 via communication unit 10a. When communication unit 10a does not receive the request signal, the address is not transmitted.

Wireless controller 20 is, for example, a wireless access point such as a wireless adaptor. Wireless controller 20 includes communication unit 20a and control unit 20c connected to communication unit 20a.

Communication unit 20a includes, for example, an antenna and a wireless module. Communication unit 20a communicates with luminaire 1 over radio r2 and communicates with setting device 30 over radio r3.

For example, control unit 20c includes a CPU, RAM, and ROM. Control unit 20c stores identification information on wireless controller 20, such as a MAC address. Control unit 20c performs pairing with luminaire 1 based on, for example, a pairing request transmitted from luminaire 1.

Setting device 30 is an operable terminal such as a tablet PC. Setting device 30 includes communication unit 30a, display input unit 30d, and control unit 30c connected to communication unit 30a and display input unit 30d.

Display input unit 30d is, for example, a touch panel. Display input unit 30d receives an input from the operator who performs the pairing process, and displays, for example, the layout and addresses of luminaires 1 through n. As will be described later, association of the locations and address of luminaires 1 through n is performed via display input unit 30d.

Communication unit 30a communicates with luminaire 1 over radio r1 and communicates with wireless controller 20 over radio r3. In this embodiment, communication unit 30a transmits an address request signal (hereinafter also simply referred to as a "request signal") to a plurality of unspecified luminaires 1 through n at a predetermined transmission power level.

Control unit 30c includes transmission power adjusting unit 30b that adjusts the transmission power of the request signal. For example, transmission power adjusting unit 30b can adjust the transmission power used upon radio transmission (hereinafter also referred to as "radio transmission power") within a range of from 0 to 20 mW. For example, transmission power adjusting unit 30b can reduce the number of luminaires that receive the request signal by reducing the transmission power, and increase the number of luminaires that receive the request signal by increasing the transmission power (see FIG. 6A and FIG. 6B).

For example, control unit 30c includes a CPU, RAM, and ROM. A target range for a total number of addresses to be transmitted by luminaires 1 through n is stored in control unit 30c. For example, the target range for the total number of addresses is set to a range of from 1 to 3 luminaires in order to make it easier for the operator to associate the location of the luminaires with the addresses. Moreover, layout information indicating the layout of luminaires 1 through n in the building and the address of wireless controller 20 are stored in control unit 30c in advance.

Control unit 30c determines whether the total number of addresses transmitted from luminaires 1 through n is within the target range or not.

When the total number of addresses is outside the target range, control unit 30c instructs communication unit 30a to transmit the request signal to the plurality of luminaires at a transmission power level different from the transmission power level last used. For example, control unit 30c instructs communication unit 30a to retransmit the request signal at a lower transmission power level than last used when the total number of addresses is greater than an upper limit of the target range, and instructs communication unit 30a to retransmit the request signal at a higher transmission power level than last used when the total number of addresses is short of the target range. Control unit 30c repeatedly adjusts the transmission power until the total number of addresses is within the target range (see S14 in FIG. 4).

Moreover, when the total number of addresses is within the target range, control unit 30c executes pairing between the luminaires that responded to the request signal (for example, luminaires 1 through k) and wireless controller 20. More specifically, control unit 30c executes the above-described pairing after receiving an input for mapping the addresses of luminaires 1 through k. Here, mapping refers to associating the locations and addresses of luminaires 1 through k that responded to the request signal. For example, this is input by matching an address of a luminaire displayed on display input unit 30d with a mark indicating the luminaire, also displayed on display input unit 30d (see FIG. 8). Control unit 30c instructs, via communication unit 30a, the pairing of luminaires 1 through k with wireless controller 20 after receiving this input and associating the locations and addresses of luminaires 1 through k.

This configuration allows lighting system 100 to efficiently perform the pairing setting operation for luminaires 1 through n with wireless controller 20.

1-3. Lighting System Pairing Method

Figure 4:
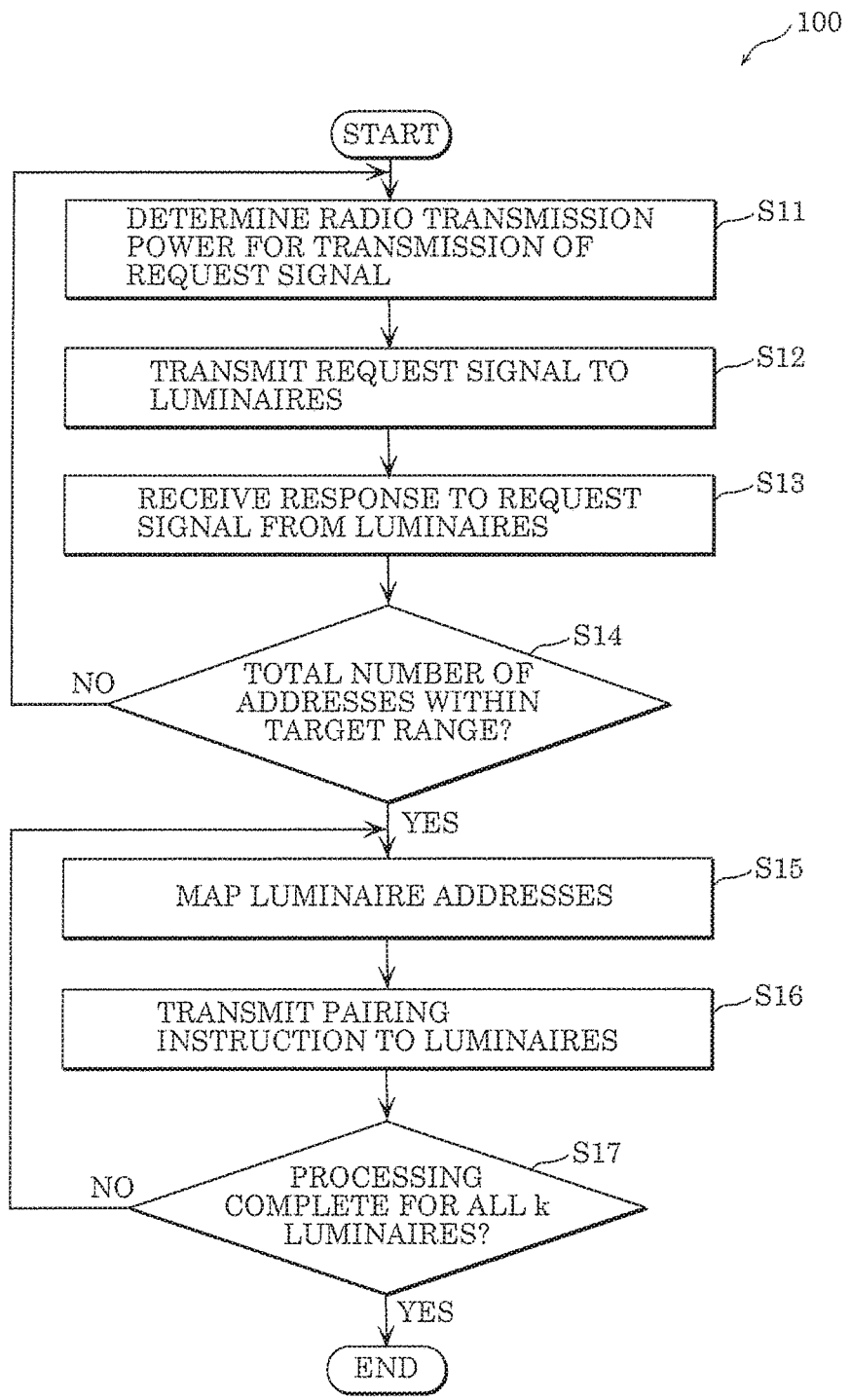
FIG. 4 is a flow chart illustrating a pairing method for a lighting system according to Embodiment 1.
Figure 5:
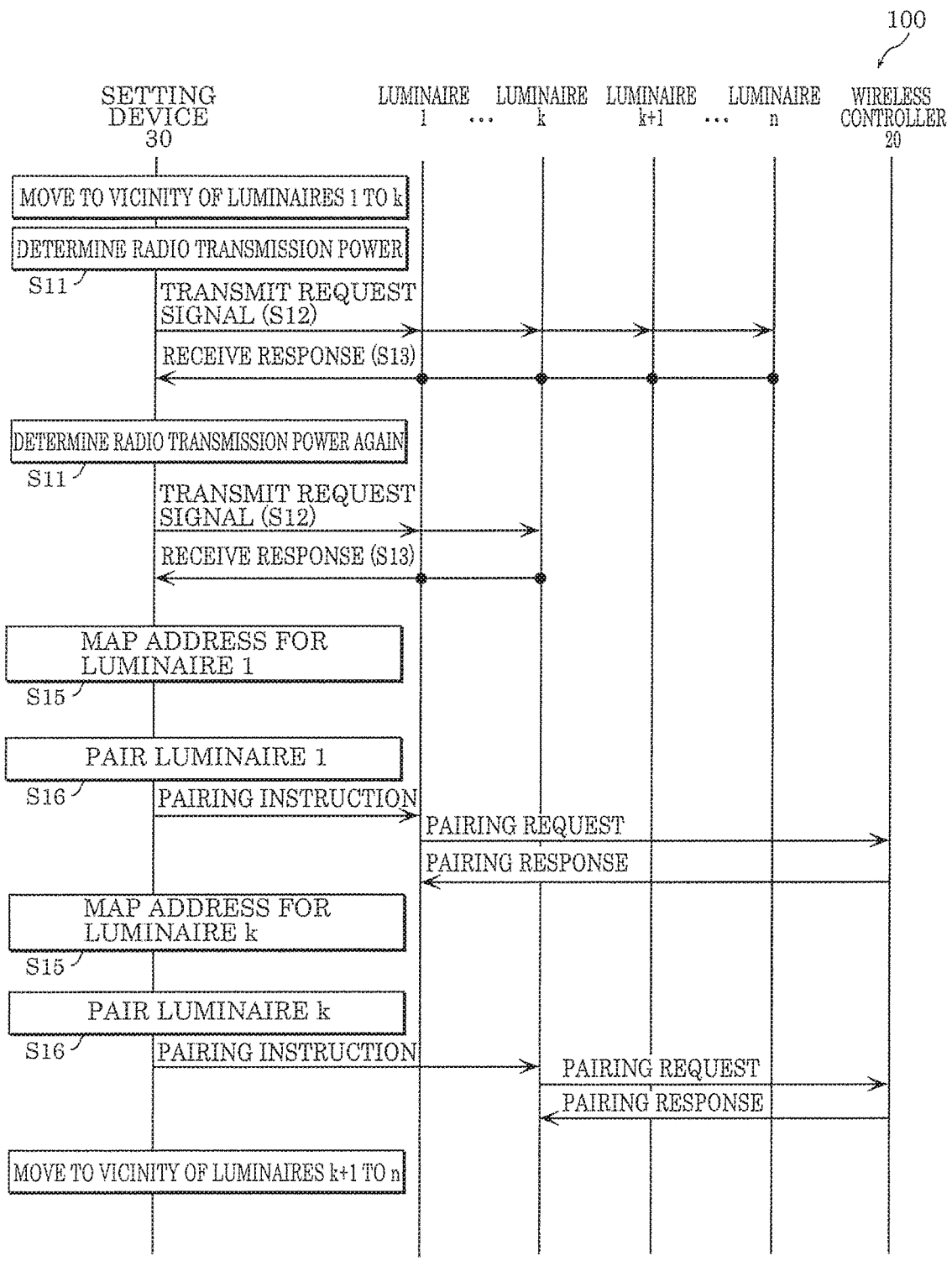
FIG. 5 is a sequence chart illustrating one example of a pairing method for a lighting system according to Embodiment 1.
Figure 6A:
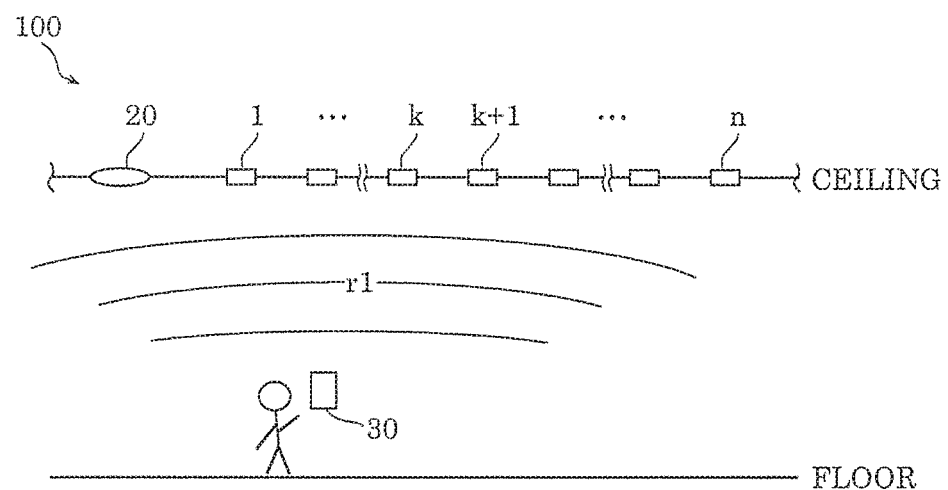
FIG. 6A illustrates transmission of a signal to luminaires at a first radio transmission power level using a setting device according to Embodiment 1.
Figure 6B:
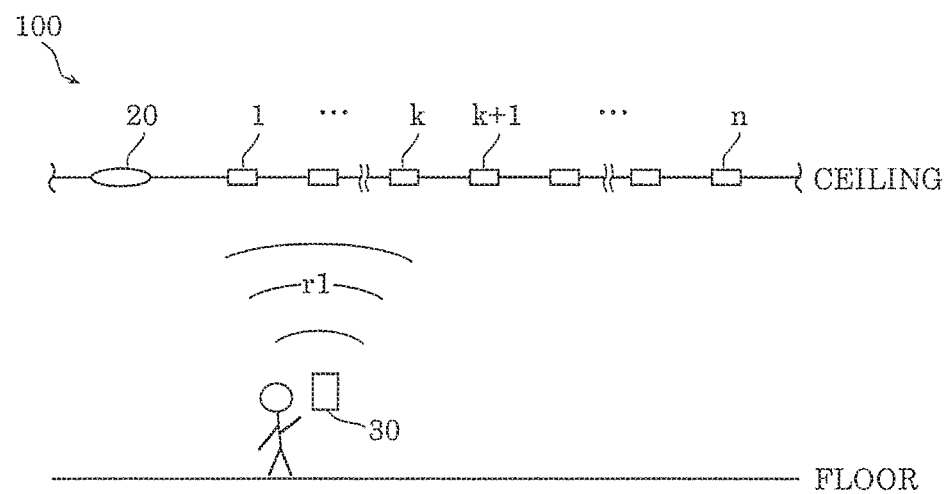
FIG. 6B illustrates transmission of a signal to luminaires at a second radio transmission power level different from the first radio transmission power level using a setting device according to Embodiment 1.

Next, the pairing method for lighting system 100 will be described with reference to FIG. 4 through FIG. 8. FIG. 4 is a flow chart illustrating a pairing method for lighting system 100. FIG. 5 is a sequence chart illustrating one example of a pairing method for lighting system 100. FIG. 6A illustrates transmission of the request signal at a first radio transmission power level in lighting system 100, and FIG. 6B illustrates transmission of the request signal at a second radio transmission power level different from the first radio transmission power level.

First, setting device 30 is moved to the vicinity of luminaires 1 through k (see FIG. 6A). Note that pairing for luminaires 1 through n has not yet been executed.

Next, as illustrated in FIG. 4 and FIG. 5, the radio transmission power for transmission of the request signal is determined (S11). When instructing transmission of the request signal to luminaires 1 through n for the first time, control unit 30c in setting device 30 instructs communication unit 30a to transmit the request signal at the first radio transmission power level. In the present embodiment, the radio transmission power is a predetermined rated value. For example, the radio transmission power is determined to be 20 mW, which is the maximum level of power that can be used for transmission.

Next, the address request signal is transmitted to luminaires 1 through n at the radio transmission power level determined in step S11 (S12). As illustrated in FIG. 6A, this address request signal is transmitted from setting device 30 by being broadcast toward a plurality of unspecified luminaires 1 through n.

Having received the request signal, each luminaire 1 through n responds by transmitting its own address to setting device 30, and control unit 30c in setting device 30 receives the responses from luminaires 1 through n (S13).

Control unit 30c in setting device 30 counts the total number of addresses transmitted from luminaires 1 through n, and determines whether the total number of addresses is within the target range or not (S14). The target range for the total number of addresses is, for example, a range of from 1 to k, and in this embodiment, is set to a range of from 1 to 3.

In step 814, when the total number of addresses is n and therefore outside the target range (1 to k) (no in S14), processing returns to step S11, and the radio transmission power for transmission of the request signal is determined once again (S11). More specifically, since the total number of addresses is greater than an upper limit of the target range, the level of the radio transmission power to be used (second radio transmission power) is set lower than the level of the radio transmission power last used (first radio transmission power).

Next, the address request signal is transmitted to the luminaires at the radio transmission power level determined in step S11 (S12). This address request signal is also transmitted by being broadcast toward the plurality of luminaires. Since this request signal is transmitted at a lower radio transmission power level than last used, the request signal does not reach luminaires k+1 through n located far away, and only reaches luminaires 1 through k located nearby, as illustrated in FIG. 6B.

Luminaires 1 through k, which are the luminaires that received the request signal among luminaires 1 through n, respond by transmitting their own addresses to setting device 30, and control unit 30c in setting device 30 receives the responses from luminaires 1 through k (S13).

Next, control unit 30c in setting device 30 counts the total number of addresses, and determines whether the total number of addresses is within the target range or not (S14). This time, since the total number of addresses is k, which is within the target range (1 to k) (yes in S14), processing does not return to step S11, but rather proceeds to step S15.

Figures 7, 8:
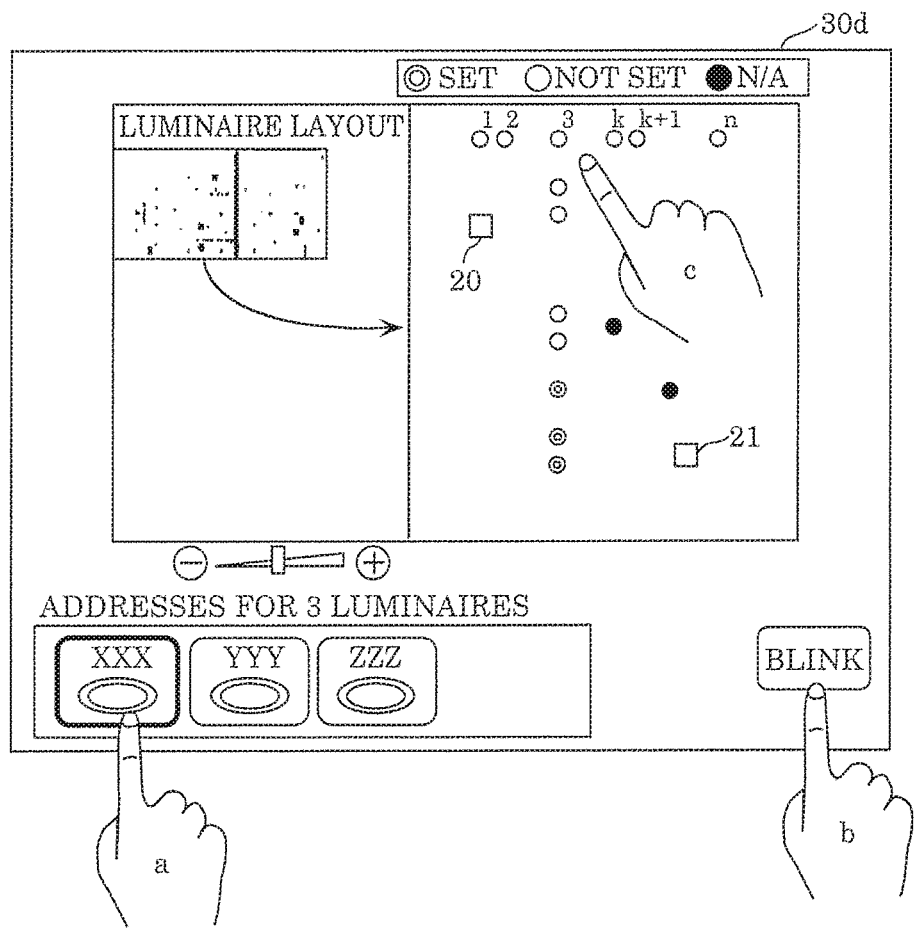
FIG. 7 illustrates one example of radio transmission power levels and total numbers of addresses in a lighting system according to Embodiment 1.
FIG. 8 illustrates one example of the process of associating locations and addresses of luminaires in a lighting system according to Embodiment 1.

Next, an example will be given with reference to FIG. 7 in which the radio transmission power is reduced in stages until the total number of addresses falls within the target range. FIG. 7 illustrates one example of radio transmission power levels and total numbers of addresses in lighting system 100. In FIG. 7, the target range is exemplified as being 1 to 3.

As illustrated in FIG. 7, the first time transmission of the request signal is instructed, the request signal is transmitted at a radio transmission power level of 20 mW, which is the maximum level of power that can be used for transmission. Since the total number of addresses from the luminaires is 30, which is outside the target range (target number=1 to 3), the requirement is not satisfied. Next, over the second, third, fourth, and fifth attempts, the radio transmission power is reduced in stages. In this example, on the fifth attempt when the request signal is transmitted at a radio transmission power level of 0.3 mW, the total number of addresses falls within the target range, thereby satisfying the requirement. Note that the determining of whether the requirement is satisfied or not and the adjusting of the radio transmission power are performed by control unit 30c automatically.

As illustrated in FIG. 4 and FIG. 5, when the total number of addresses is determined to fall within the target range, mapping of the addresses to luminaires 1 through k is performed (S15). More specifically, the locations of luminaires 1 through k that responded to the request signal are associated with the addresses transmitted from luminaires 1 through k.

FIG. 8 illustrates one example of the process of associating locations and addresses of luminaires in lighting system 100. In FIG. 8, the layout of luminaires 1 through n in the building and the addresses (XXX, YYY, ZZZ) transmitted from a given number of luminaires 1 through n are displayed on display input unit 30d of setting device 30.

For example, as indicated by "a" in FIG. 8, the address XXX displayed on display input unit 30d is selected. Next, as indicated by "b" in FIG. 8, when the "blink" icon is pressed, a command for causing the selected luminaire to blink is transmitted, whereby the luminaire having the address XXX blinks on and off. By visually confirming the location of the blinking luminaire, one can recognize which luminaire on display input unit 30d corresponds to the luminaire having the address XXX. Next, as indicated by "c" in FIG. 8, the position and address XXX of luminaire 1 are associated by touching the mark indicating the luminaire on display input unit 30d that corresponds to the location of the blinking luminaire (for example, luminaire 1). This completes the mapping of the address XXX for luminaire 1.

Next, a pairing instruction is transmitted to luminaire 1 having the address XXX (S16). The signal relating to this pairing instruction is transmitted to luminaire 1 from control unit 30c in setting device 30 by unicast. Moreover, along with the signal for the pairing instruction, the address of wireless controller 20, which is the pairing partner, is simultaneously transmitted. Note that whether to select wireless controller 20 or 21 as the pairing partner is determined based on, for example, the layout of wireless controllers 20 and 21 displayed on display input unit 30d.

Luminaire 1 to which the pairing instruction was transmitted makes a pairing request to wireless controller 20, and wireless controller 20 responds to the pairing request. This results in luminaire 1 and wireless controller 20 exchanging addresses and completes the pairing of luminaire 1 and wireless controller 20.

Next, it is determined whether pairing of all of the k luminaires that responded to the request signal is complete or not (S17). Here, if there is a luminaire that is not paired (no in S17), steps S15 and S16 are performed for that luminaire. In the above example, steps S15 and S16 are performed for addresses YYY and ZZZ on display input unit 30d. When pairing is complete for all of the k luminaires (yes in S17), pairing is ended for luminaires 1 through k. Then, setting device 30 is moved to the vicinity of luminaires k+1 through n, which are different luminaires from luminaires 1 through k, and steps S11 through S17 are performed in the same fashion as described above. Repeating this process makes it possible to efficiently perform the pairing setting operation for luminaires 1 through n.

1-4. Advantageous Effects, Etc.

Lighting system 100 according to this embodiment includes: a plurality of luminaires 1 through n; wireless controller 20 that wirelessly communicates with the plurality of luminaires 1 through n; and setting device 30 that wirelessly communicates with the plurality of luminaires 1 through n. The plurality of luminaires 1 through n have mutually different addresses. Setting device 30 includes communication unit 30a configured to transmit an address request signal at a first transmission power level, and control unit 30c configured to determine whether a total number of the addresses transmitted from one or more of the plurality of luminaires 1 through n (for example, luminaires 1 through k) in response to receiving the address request signal is within a target range. Control unit 30c is configured to instruct communication unit 30a to transmit the address request signal at a second transmission power level different from the first transmission power level when the total number of the addresses is outside the target range, and execute pairing of the one or more of the plurality of luminaires 1 through k that responded to the address request signal with wireless controller 20 when the total number of the addresses is within the target range.

In this way, by adjusting the transmission power of the request signal transmitted from setting device 30, the number of luminaires 1 through k that receive the request signal can be adjusted, making it possible to place the total number of addresses transmitted from luminaires 1 through k within the target range. This makes it possible to make the number of luminaires 1 through k to undergo the pairing setting operation fall within the target range and thus efficiently perform the pairing setting operation for luminaires 1 through k and wireless controller 20.

Moreover, when the total number of the addresses is greater than an upper limit of the target range, control unit 30c may be configured to set the second transmission power level lower than the first transmission power level and instruct transmission of the address request signal.

This makes it possible to, with certainty, bring the total number of addresses closer to the target range and efficiently perform the pairing setting operation for luminaires k+1 through n and wireless controller 20.

Moreover, when the total number of the addresses is within the target range, control unit 30c of setting device 30 may be configured to, after receiving an input associating a location of the one or more of the plurality of luminaires 1 through k that responded to the address request signal with the address of the one or more of the plurality of luminaires 1 through k, instruct, via communication unit 30a, the one or more of the plurality of luminaires 1 through k to pair with wireless controller 20.

With this configuration, since pairing is performed after the locations and addresses of luminaires 1 through k have been associated, it is possible to control the lighting of luminaires 1 through k via wireless controller 20.

Setting device 30 according to this embodiment executes pairing of a plurality of luminaires 1 through n having mutually different addresses with wireless controller 20, includes: communication unit 30a configured to wirelessly transmit an address request signal at a first transmission power level; and control unit 30c configured to determine whether a total number of the addresses transmitted from one or more of the plurality of luminaires 1 through n (for example, luminaires 1 through k) in response to receiving the address request signal is within a target range. Control unit 30c is configured to instruct communication unit 30a to transmit the address request signal at a second transmission power level different from the first transmission power level when the total number of the addresses is outside the target range, and execute pairing of the one or more of the plurality of luminaires 1 through k that responded to the address request signal with wireless controller 20 when the total number of the addresses is within the target range.

In this way, by adjusting the transmission power of the request signal transmitted from setting device 30, the number of luminaires 1 through k that receive the request signal can be adjusted, making it possible to place the total number of addresses transmitted from luminaires 1 through k within the target range. This makes it possible to make the number of luminaires 1 through k to undergo the pairing setting operation fall within the target range and thus efficiently execute pairing of luminaires 1 through k and wireless controller 20 using setting device 30.

Moreover, when the total number of the addresses is greater than an upper limit of the target range, control unit 30c may be configured to set the second transmission power level lower than the first transmission power level and instruct transmission of the address request signal.

A pairing method according to this embodiment for lighting system 100 including a plurality of luminaires 1 through n having mutually different addresses, wireless controller 20 that wirelessly communicates with the plurality of luminaires 1 through n, and setting device 30 that wirelessly communicates with the plurality of luminaires 1 through n, includes: transmitting, by setting device 30, an address request signal at a first transmission power level; transmitting, by one or more of the plurality of luminaires 1 through n (for example, luminaires 1 through k) in response to receiving the address request signal, the address of the one or more of the plurality of luminaires 1 through k to setting device 30; when a total number of the addresses transmitted is outside a target range, transmitting, by setting device 30, the address request signal at a second transmission power level different from the first transmission power level, and when the total number of the addresses transmitted is within the target range, instructing, by setting device 30, the one or more of the plurality of luminaires 1 through k that responded to the address request signal to pair with wireless controller 20; and executing, by the one or more of the plurality of luminaires 1 through k instructed to pair with wireless controller 20, the pairing with wireless controller 20.

In this way, by adjusting the transmission power of the request signal, the number of luminaires 1 through k that receive the request signal can be adjusted, making it possible to place the total number of addresses transmitted from luminaires 1 through k within the target range. This makes it possible to make the number of luminaires 1 through k to undergo the pairing setting operation fall within the target range and thus efficiently perform the pairing setting operation for luminaires 1 through k and wireless controller 20.

Moreover, in the pairing method for lighting system 100, when the total number of the addresses is greater than an upper limit of the target range, the transmitting may involve setting the second transmission power level lower than the first transmission power level and transmitting the address request signal by setting device 30.

Moreover, in the pairing method for lighting system 100, when the total number of the addresses is within the target range, the instructing may be performed after receiving an input associating a location of the one or more of the plurality of luminaires 1 through k that responded to the address request signal with the address of the one or more of the plurality of luminaires 1 through k.

1-5. Variations 1 and 2 of Embodiment 1

FIG. 9 illustrates one example of radio transmission power levels and total numbers of addresses according to Variation 1 of Embodiment 1. Next, an example will be given with reference to FIG. 9 in which the radio transmission power is increased in stages until the total number of addresses falls within the target range.

As illustrated in FIG. 9, the first time the transmission of the request signal is instructed, the request signal is transmitted at a radio transmission power level of 0.1 mW, which is the minimum level of power that can be used for transmission. Since the total number of addresses from the luminaires is 0, which is outside the target range (target number=1 to 3), the requirement is not satisfied. Accordingly, in the subsequent request signal transmission attempts, the radio transmission power is adjusted so as to gradually increase. In this example, on the third attempt when the request signal is transmitted at a radio transmission power level of 0.3 mW, the total number of addresses falls within the target range, thereby satisfying the requirement.

FIG. 10 illustrates one example of radio transmission power levels and total numbers of addresses according to Variation 2 of Embodiment 1. Next, an example will be given with reference to FIG. 10 in which the amount of change in radio transmission power is gradually reduced until the total number of addresses falls within the target range.

As illustrated in FIG. 10, the first time the transmission of the request signal is instructed, the request signal is transmitted at a radio transmission power level of 10 mW, which is the median level of power that can be used for transmission. Since the total number of addresses from the luminaires is 30, which is outside the target range (target number=1 to 3), the requirement is not satisfied. Since the total number of addresses is greater than an upper limit of the target range, over the next second through sixth request signal transmission attempts, the radio transmission power is adjusted by reducing it to a level lower than the first time the request signal was transmitted while also gradually reducing the amount of change in radio transmission power. In this example, on the sixth attempt when the request signal is transmitted at a radio transmission power level of 0.3 mW, the total number of addresses falls within the target range, thereby satisfying the requirement.

In Embodiment 1 and Variations 1 and 2 of Embodiment 1, when instructing transmission of the address request signal for the first time to luminaires 1 through k, which are the luminaires among luminaires 1 through n for which pairing has not been executed, control unit 30c in setting device 30 instructs communication unit 30a to transmit the request signal at a transmission power level that is a predetermined rated value.

This makes it possible to easily determine the transmission power for transmitting the request signal for the first time, and efficiently perform the pairing setting operation for luminaires 1 through k and wireless controller 20.

1-6. Variation 3 of Embodiment 1

Figures 11A, 11B:
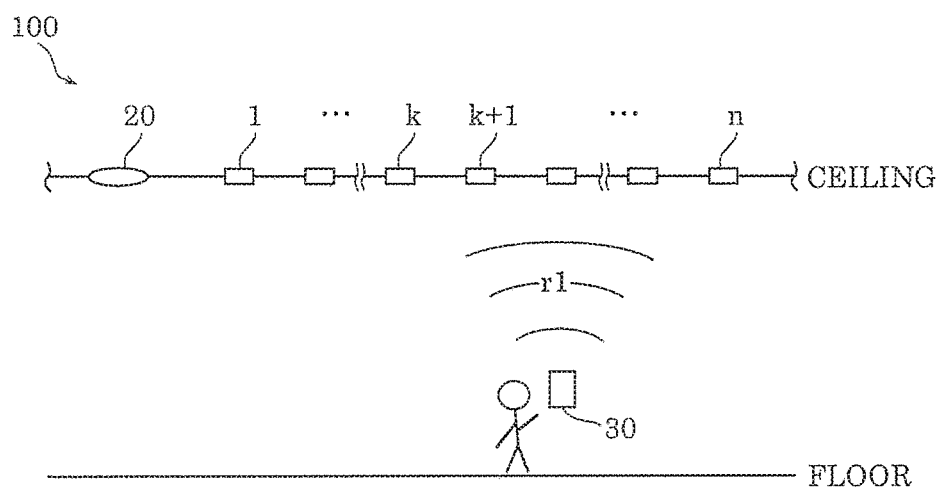
FIG. 11A illustrates transmission of a signal to luminaires at a first radio transmission power level using a setting device according to Variation 3 of Embodiment 1.
FIG. 11B illustrates one example of a radio transmission power level and a total number of addresses according to Variation 3 of Embodiment 1.

In Variation 3 of Embodiment 1, an example will be given in which the request signal is transmitted at a previously used transmission power level. FIG. 11A illustrates transmission of a signal to luminaires k+1 through n at a first radio transmission power level using setting device 30 according to Variation 3 of Embodiment 1.

In Variation 3, after pairing for luminaires 1 through k is complete, setting device 30 is moved to the vicinity of luminaires k+1 through n, as illustrated in FIG. 11A. Next, the radio transmission power for transmission of the request signal is determined (S11). Note that pairing for luminaires k+1 through n has not yet been executed.

Here, when instructing transmission of the request signal for the first time to perform the pairing setting operation for luminaires k+1 through n, control unit 30c in setting device 30 determines to transmit the request signal at a previously used transmission power level that resulted in the total number of addresses being within the target range. Here, the radio transmission power is determined to be the same level that resulted in the total number of addresses being within the target range for luminaires 1 through k, and, more specifically, is determined to be, for example, 0.3 mW.

Next, the address request signal is transmitted to luminaires k+1 through n at the radio transmission power level determined in step S11 (S12). Luminaires k+1 through n, which are the luminaires that received the request signal among luminaires 1 through n, respond by transmitting their own addresses to setting device 30, and control unit 30c in setting device 30 receives the responses from luminaires k+1 through n (S13). Next, control unit 30c in setting device 30 counts the total number of addresses, and determines whether the total number of addresses is within the target range or not (S14).

FIG. 11B illustrates one example of a radio transmission power level and a total number of addresses according to Variation 3 of Embodiment 1. As illustrated in FIG. 11B, the first time the transmission of the request signal is requested, the request signal is transmitted at a radio transmission power level of 0.3 mW, which is a previously used transmission power level that resulted in the total number of addresses was within the target range. In this example, the total number of addresses fall within the target range on the first attempt, thereby satisfying the requirement.

In Variation 3 described above, when instructing transmission of the request signal for the first time to luminaires k+1 through n, which are the luminaires among luminaires 1 through n for which pairing has not been executed, control unit 30c in setting device 30 instructs communication unit 30a to transmit the request signal at a previously used transmission power level that resulted in the total number of addresses being within the target range.

This makes it possible to bring the total number of addresses within the target range with few attempts and thus efficiently perform the pairing setting operation for luminaires k+1 through n and wireless controller 20.

Embodiment 2

Lighting system 100A according to Embodiment 2 will be described with reference to FIG. 12 through FIG. 15. With lighting system 100A according to Embodiment 2, building layout information on lighting system 100A is used to determine the radio transmission power for the first transmission.

Figure 12:
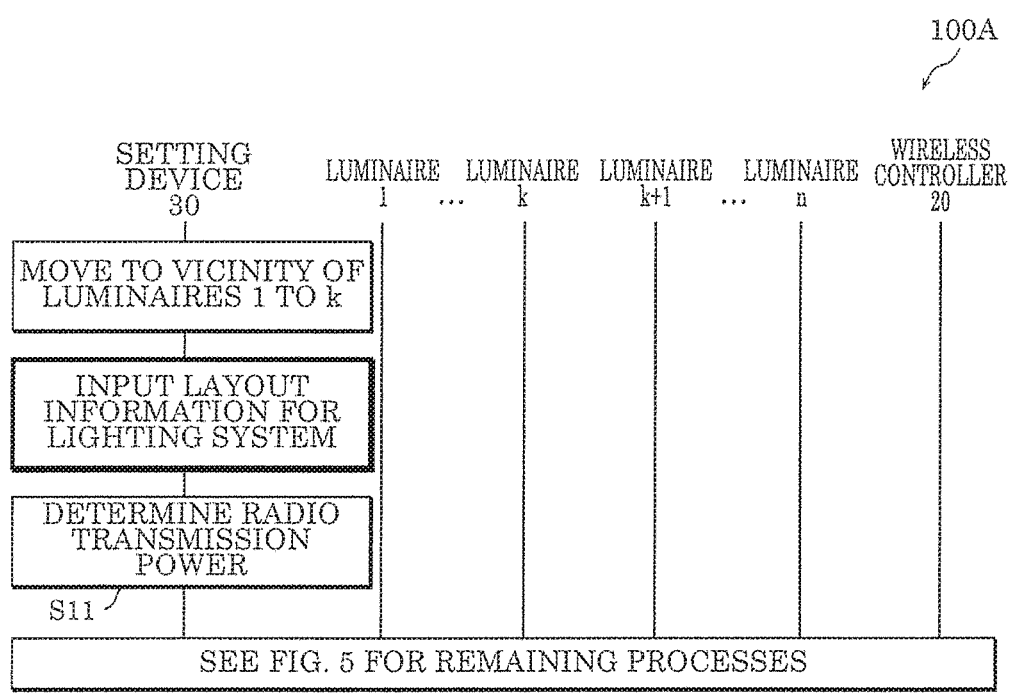
FIG. 12 is a sequence chart illustrating one example of a pairing method for a lighting system according to Embodiment 2.
Figure 13:
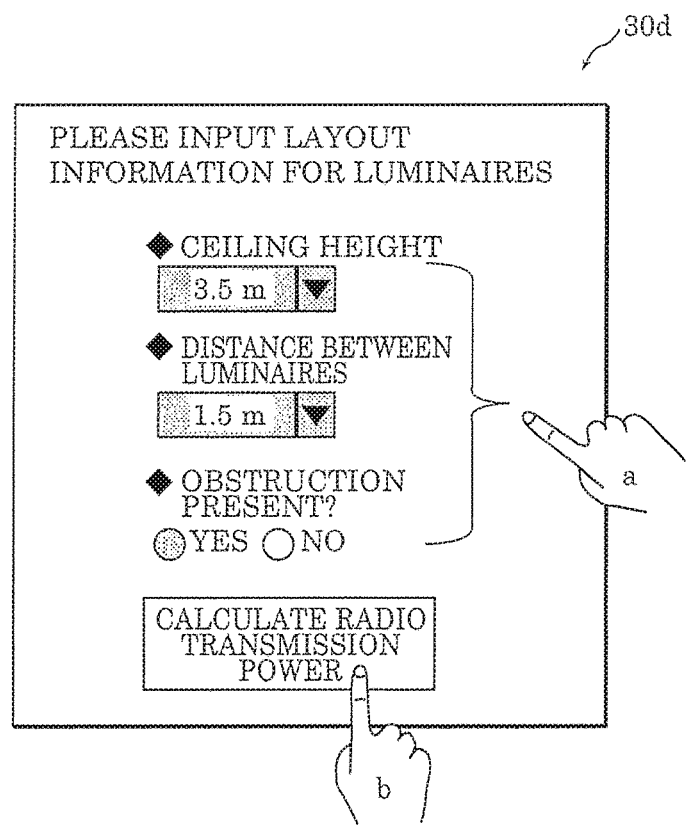
FIG. 13 illustrates layout information on a lighting system that is displayed on a setting device according to Embodiment 2.
Figure 14:
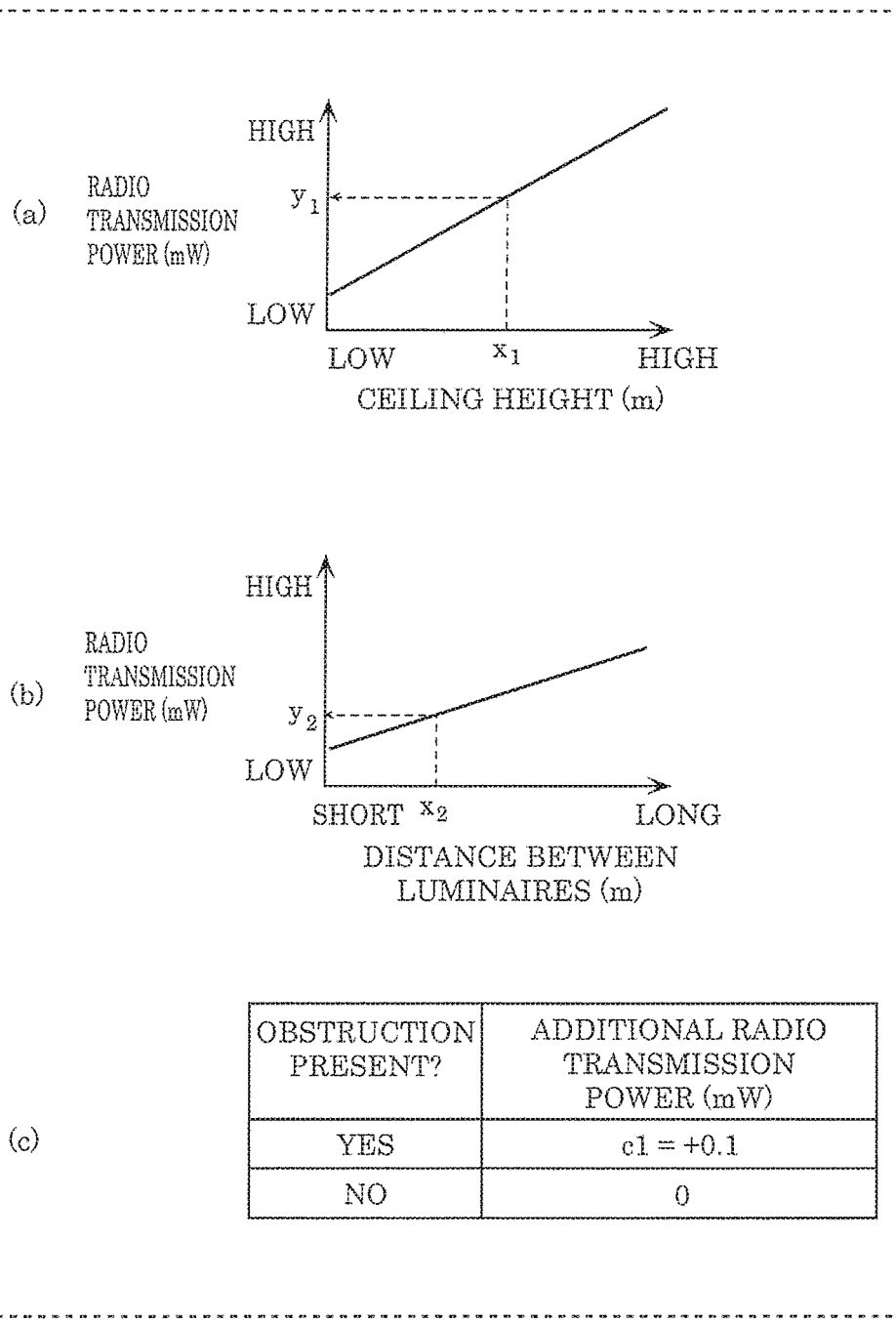
FIG. 14 illustrates equations expressing relations between layout information on a lighting system and radio transmission power according to Embodiment 2.

FIG. 12 is a sequence chart illustrating one example of a pairing method for lighting system 100A. FIG. 13 illustrates layout information on lighting system 100A that is displayed on setting device 30. FIG. 14 illustrates equations expressing relations between layout information on lighting system 100A and radio transmission power.

First, setting device 30 is moved to the vicinity of luminaires 1 through k, as illustrated in FIG. 12. Next, layout information on lighting system 100A is input into setting device 30. More specifically, as illustrated in FIG. 13, the height of the ceiling measured from the floor, the distance between adjacent luminaires, and the presence or absence of an obstruction in the vicinity of the luminaire are input as the layout information on lighting system 100A. In this example, the input layout information on luminaires 1 through k indicates that the height of the ceiling is 3.5 m, the distance between luminaires is 1.5 m, and an obstruction is present. After this layout information is input, the radio transmission power for the request signal is calculated by touching the "calculate radio transmission power" icon displayed on display input unit 30d.

Here, one example of the calculation of radio transmission power will be given. An equation expressing a relation between the layout information on lighting system 100A and the radio transmission power that should be used for transmission from setting device 30, such as the equation shown in FIG. 14, is stored in advance in control unit 30c in setting device 30.

In FIG. 14, (a) indicates a graph of an equation expressing the relation between ceiling height and radio transmission power. From this equation, for example, when the current ceiling height is x1 (m), the radio transmission power required to place the total number of addresses within the target range is calculated as being y1 (mW). In FIG. 14, (b) indicates a graph of an equation expressing the relation between distance between luminaires and radio transmission power. From this equation, for example, when the current distance between luminaires is x2 (m), the radio transmission power required to place the total number of addresses within the target range is calculated as being y2 (mW). In FIG. 14, (c) indicates a graph of an equation expressing the relation between the vicinity of a luminaire and radio transmission power. From this equation, for example, when an obstruction is present in the vicinity of a luminaire, it is calculated that c1=0.1 (mW) should be added to the radio transmission power. Note that this equation is based on the relation that the radio transmission power is 0.1 mW when an obstruction is present (1) and the radio transmission power is 0 mW when an obstruction is not present (0).

Next, for example, the radio transmission power for the request signal is calculated by inserting, into Equation 1 shown below, the values calculated by inputting the current layout information into the equations. For example, when y1=0.3 mW, y2=0.1 mW, and c1=0.1 mW, the radio transmission power for the request signal is calculated as 0.3 mW.

$$\text{radio transmission power} = (y1+y2)/2 + c1 \quad \text{(Equation 1)}$$

The radio transmission power is determined as described above (S11), and the request signal is transmitted to luminaires 1 through n at the determined radio transmission power level (subsequent processes are as illustrated in FIG. 5).

Figures 15, 16, 17:
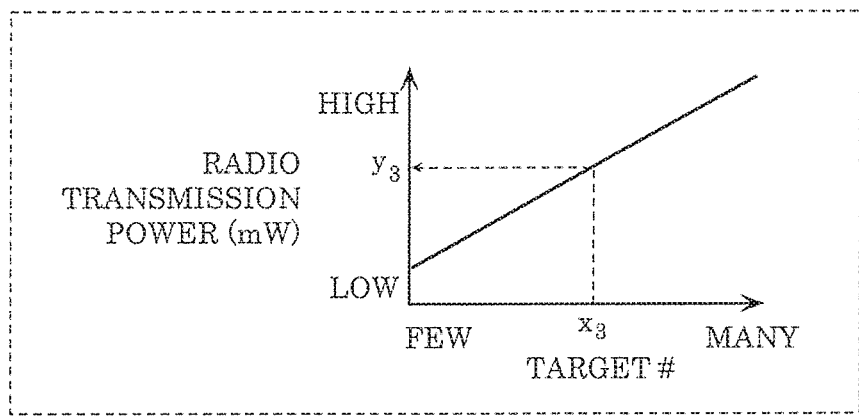
FIG. 15 illustrates one example of radio transmission power levels and total numbers of addresses in a lighting system according to Embodiment 2.
FIG. 16 illustrates an equation expressing a relation between a target number for a total number of addresses and radio transmission power according to a variation of Embodiment 2.
FIG. 17 illustrates one example of radio transmission power levels and total numbers of addresses in a lighting system according to a variation of Embodiment 2.

FIG. 15 illustrates one example of radio transmission power levels and total numbers of addresses in lighting system 100A according to Embodiment 2. Next, an example will be given with reference to FIG. 15 in which the radio transmission power is adjusted until the total number of addresses falls within the target range.

As illustrated in FIG. 15, the first time the transmission of the request signal is instructed, the request signal is transmitted at a radio transmission power level of 0.3 mW, which is the value obtained from Equation 1 above. Since the total number of addresses from the luminaires is 4, which is outside the target range (target number=1 to 3), the requirement is not satisfied. In this example, on the second attempt when the request signal is transmitted at a reduced radio transmission power level of 0.2 mW, the total number of addresses falls within the target range, thereby satisfying the requirement.

In Embodiment 2, when instructing transmission of the request signal for the first time to luminaires 1 through n for which pairing has not been executed, control unit 30c in setting device 30 instructs communication unit 30a to transmit the request signal at a transmission power level calculated by inputting current layout information on lighting system 100A into an equation stored in advance and expressing a relation between layout information on lighting system 100A and a transmission power level required to bring the total number of addresses within the target range.

This makes it possible to appropriately determine the transmission power for transmitting the request signal for the first time, and thus efficiently perform the pairing setting operation for luminaires 1 through n and wireless controller 20.

Variation of Embodiment 2

In this variation of Embodiment 2, another example of the calculation of radio transmission power will be given.

FIG. 16 is a graph of an equation expressing the relation between the target number for the total number of addresses and radio transmission power. An equation expressing a relation between the target number for the total number of addresses and the radio transmission power that should be used for transmission from setting device 30, such as shown in FIG. 16, is stored in advance in control unit 30c in setting device 30.

From this equation, for example, when the desired target number for the total number of addresses is x3 (number of addresses), the radio transmission power required to equate the total number of addresses to the desired target number is calculated as being y3 (mW). In this variation, for example, the desired target number is 3, and the radio transmission power required to achieve the target number is calculated to be 0.3 mW. The radio transmission power is determined as described above (S11), and the request signal is transmitted to luminaires 1 through n.

FIG. 17 illustrates one example of radio transmission power levels and total numbers of addresses in lighting system 100A according to a variation. Next, an example will be given with reference to FIG. 17 in which the radio transmission power is adjusted until the total number of addresses falls within the target range.

As illustrated in FIG. 17, the first time the transmission of the request signal is instructed, the request signal is transmitted at a radio transmission power level of 0.3 mW, which is the value obtained from the above-described equation. Since the total number of addresses from the luminaires is 4, which is outside the target range (target number=1 to 3), the requirement is not satisfied. In this example, on the second attempt when the request signal is transmitted at a reduced radio transmission power level of 0.2 mW, the total number of addresses falls within the target range, thereby satisfying the requirement.

In this variation of Embodiment 2, when instructing transmission of the request signal for the first time to luminaires 1 through n for which pairing has not been executed, control unit 30c in setting device 30 instructs communication unit 30a to transmit the request signal at a transmission power level calculated by inputting a desired target number into an equation stored in advance and expressing a relation between a target number for the total number of addresses and a transmission power level required to equate the total number of addresses to the target number.

This makes it possible to appropriately determine the transmission power for transmitting the request signal for the first time, and thus efficiently perform the pairing setting operation for luminaires 1 through n and wireless controller 20.

Embodiment 3

Lighting system 100B according to Embodiment 3 will be described with reference to FIG. 18. In Embodiment 3, the equations for calculating the radio transmission power are updated.

Figure 18:
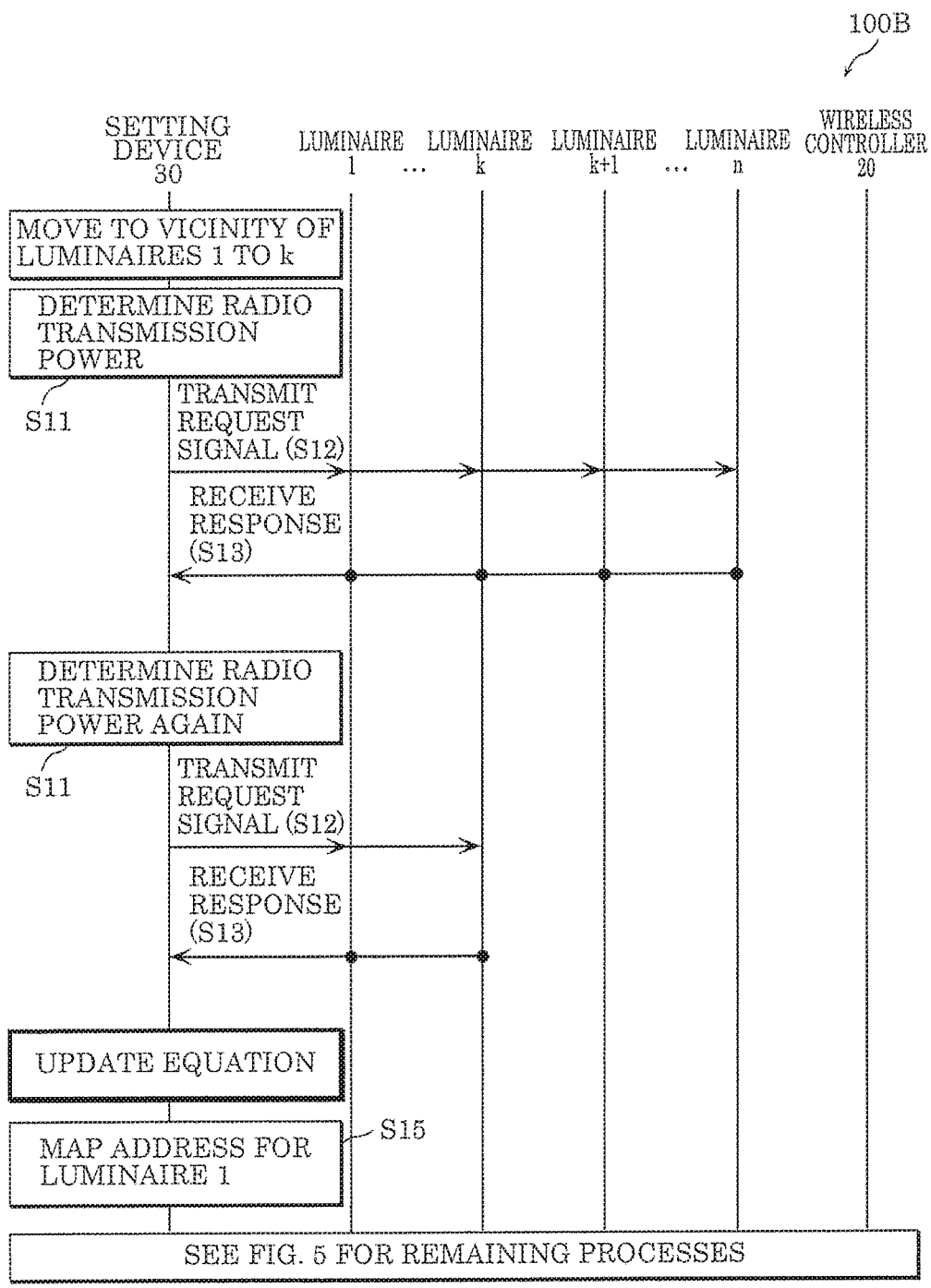
FIG. 18 is a sequence chart illustrating one example of a pairing method for a lighting system according to Embodiment 3.
Figure 19:
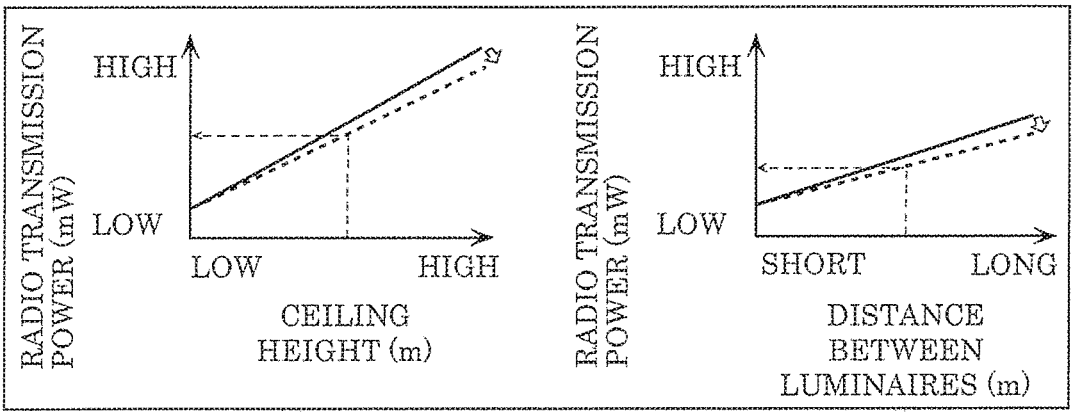
FIG. 19 illustrates an example in which, in a lighting system according to Embodiment 3, equations described in Embodiment 2 are updated based on a record of: radio transmission power determined based on layout information; and a total number of addresses actually received.

FIG. 18 is a sequence chart illustrating one example of a pairing method for lighting system 100B. FIG. 19 illustrates an example in which, in lighting system 100B, the equations described in Embodiment 2 are updated based on a record of: radio transmission power determined based on layout information; and a total number of addresses actually received.

In FIG. 18, the processes after the radio transmission power is determined once again (S11) and until the receipt of the responses from luminaires 1 through k (S13) are the same as in Embodiment 1. In Embodiment 3, in step S14, when the total number of addresses falls within the target range, the equations described above are updated.

In (a) in FIG. 19, a record including layout information and radio transmission power that resulted in the total number of addresses falling within the target range is shown. In (b) in FIG. 19, equations updated based on the record indicated in (a) are shown. For example, the equation expressing a relation between ceiling height and radio transmission power as well as the equation expressing a relation between distance between luminaires and radio transmission power are updated, as illustrated in (b) in FIG. 19, based on an instance in the record illustrated in (a) in FIG. 19 in which the total number of addresses fell within the target range as a result of the ceiling height being 3.5 m, the distance between luminaires being 1.5 m, and the radio transmission power being 0.2 mW. These updated equations are stored in control unit 30c in setting device 30, and used in the calculation of the next radio transmission power.

In Embodiment 3, control unit 30c in setting device 30 updates the equations described above in Embodiment 2 based on a record of input layout information on lighting system 100B and transmission power that resulted in the total number of addresses falling within target range.

This makes it possible to determine a radio transmission power level suitable for the circumstances of the environment in which the pairing setting operation is being performed. This makes it possible to appropriately determine the transmission power for transmitting the request signal for the first time, and thus efficiently perform the pairing setting operation for luminaires 1 through n and wireless controller 20.

Variation of Embodiment 3

Figure 20:
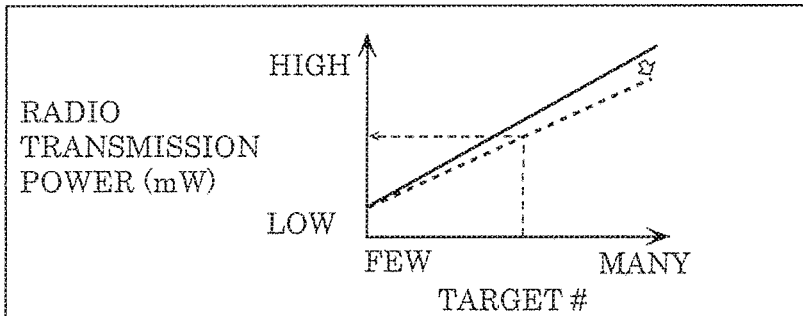
FIG. 20 illustrates an example in which, in a lighting system according to a variation of Embodiment 3, an equation described in a variation of Embodiment 2 is updated based on a record of: radio transmission power determined based on a target number for the total number of addresses; and a total number of addresses actually received.

Lighting system 100B according to this variation of Embodiment 3 will be described with reference to FIG. 20. FIG. 20 illustrates an example in which, in lighting system 100B, the equation described in the variation of Embodiment 2 is updated based on a record of: radio transmission power determined based on a target number for the total number of addresses; and a total number of addresses actually received.

In (a) in FIG. 20, a record including a target number and radio transmission power that resulted in the total number of addresses falling within the target range is shown. In (b) in FIG. 20, an equation updated based on the record indicated in (a) is shown. For example, the equation expressing a relation between the target number for the total number of addresses and radio transmission power is updated, as illustrated in (b) in FIG. 20, based on an instance in the record illustrated in (a) in FIG. 20 in which the total number of addresses fell within the target range as a result of the target number being 3 and the radio transmission power being 0.2 mW. These updated equations are stored in control unit 30c in setting device 30, and used in the calculation of the next radio transmission power.

In this variation of Embodiment 3, control unit 30c in setting device 30 updates the equations described above in Embodiment 2 based on a record of an input target number and transmission power that resulted in the total number of addresses falling within target range.

This makes it possible to place a suitable total number of addresses that make the pairing setting operation easier within the target range. This in turn makes it possible to efficiently perform the pairing setting operation for luminaires 1 through n with wireless controller 20.

Embodiment 4

Lighting system 100C according to Embodiment 4 will be described with reference to FIG. 21 and FIG. 22. Luminaires 1 through n in lighting system 100C are configured to not transmit their addresses to setting device 30 when the signal strength of the received request signal is weak.

Control unit 10c in each of luminaires 1 through n includes a measuring unit that measures signal strength (for example, a received signal strength indicator (RSSI)). This measuring unit measures the signal strength of the request signal itself based on the request signal transmitted from setting device 30. Moreover, control unit 10c stores a threshold value for the signal strength. Control unit 10c does not transmit the address when the signal strength of the request signal is less than the threshold value, and transmits the address when the signal strength is greater than or equal to the threshold value.

Figure 21:
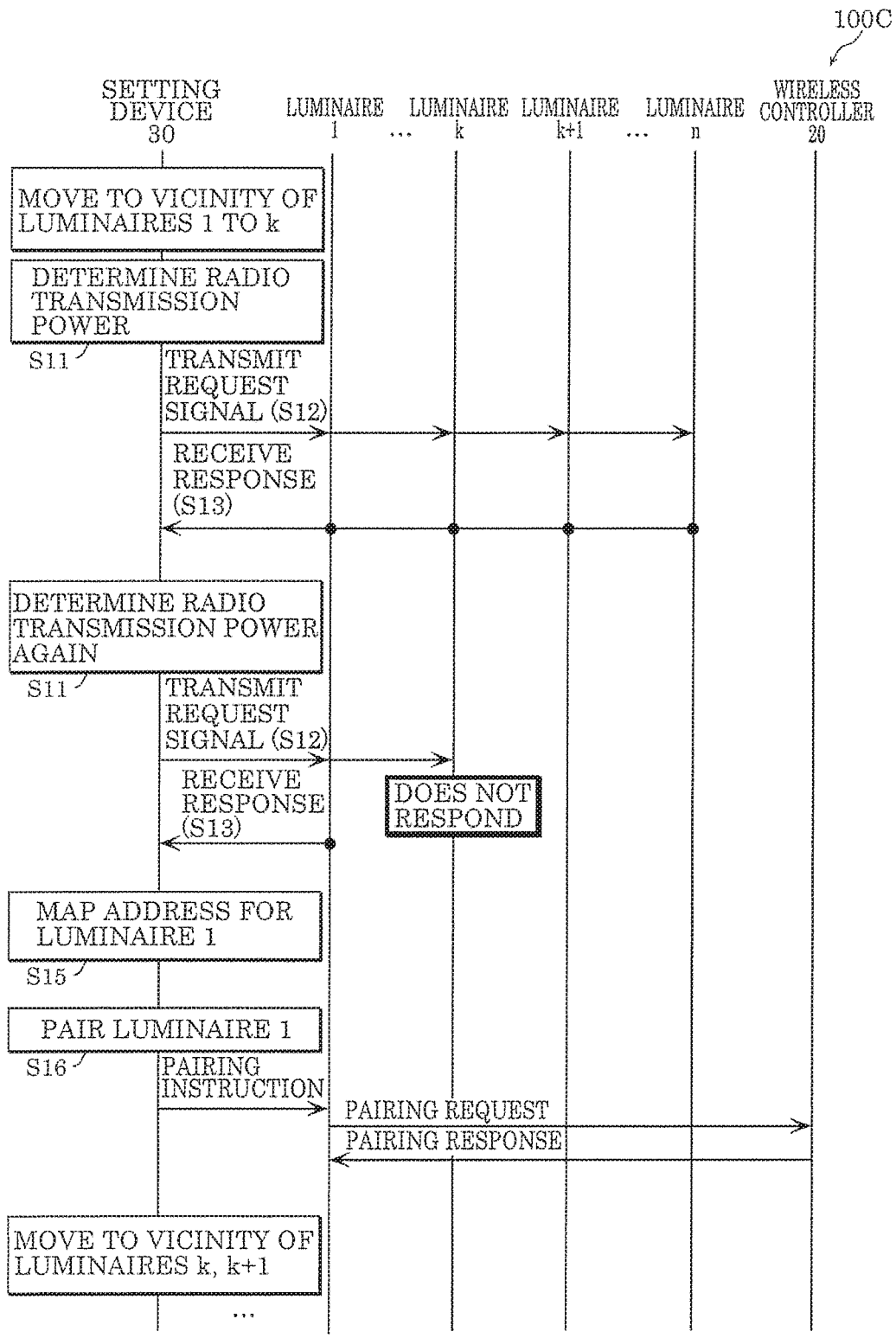
FIG. 21 is a sequence chart illustrating one example of a pairing method for a lighting system according to Embodiment 4.

FIG. 21 is a sequence chart illustrating one example of a pairing method for lighting system 100C. In FIG. 21, the processes after the radio transmission power is determined once again (S11) and until the transmission of the request signal (S12) are the same as in Embodiment 1.

As illustrated in FIG. 21, with lighting system 100C, since the signal strength of the request signal received by luminaire k among luminaires 1 through k is less than the threshold value, luminaire k does not transmit its address to setting device 30. Accordingly, with lighting system 100C, depending on the strength of the signal, luminaires 1 through n themselves determine whether to transmit their address or not. This keeps the total number of addresses counted by setting device 30 from becoming excessive.

FIG. 22 illustrates one example of radio transmission power levels and total numbers of addresses in lighting system 100C. Next, an example will be given with reference to FIG. 22 in which the radio transmission power is adjusted until the total number of addresses falls within the target range.

As illustrated in FIG. 22, the first time the transmission of the request signal is instructed, the request signal is transmitted at a radio transmission power level of 1 mW. Since the total number of addresses from the luminaires is 5, which is outside the target range (target number=1 to 3), the requirement is not satisfied. In this example, on the second attempt when the request signal is transmitted at a reduced radio transmission power level of 0.5 mW, the total number of addresses falls within the target range, thereby satisfying the requirement.

In Embodiment 4, luminaires 1 through n each include communication unit 10a that receives the request signal and control unit 10c that determines whether the signal strength of the request signal is greater than or equal to a threshold value. When the signal strength is greater than or equal to the threshold value, control unit 10c in luminaires 1 through n transmits the address to setting device 30 via communication unit 10a in luminaires 1 through n.

This keeps the total number of addresses from becoming excessive, and makes it possible to efficiently perform the pairing setting operation for luminaires 1 through n with wireless controller 20.

Other Embodiments

Hereinbefore, a lighting system, setting device, and pairing method for a lighting system have been exemplified based on exemplary embodiments and variations, but the present disclosure is not limited to the above exemplary embodiments and variations. Those skilled in the art will readily appreciate that many modifications are possible in the above exemplary embodiments and variations without materially departing from the novel teachings and technical advantages of the present disclosure. Accordingly, all such modifications are intended to be included within the scope of the present disclosure.

For example, in Embodiment 1, the radio transmission power is determined after moving setting device 30 to the vicinity of luminaires 1 through k, but this example is not limiting; setting device 30 may be moved to the vicinity of luminaires 1 through k after first determining the radio transmission power.

Moreover, in steps S15 through S17 in Embodiment 1 (see FIG. 4 and FIG. 5), after pairing luminaire 1, the address for the next luminaire k is mapped, and then luminaire k is paired, but the order in which the above is performed is not limited to this example. For example, first the addresses for luminaires 1 through k may be mapped, and then pairing may be performed for each of luminaires 1 through k thereafter.

Moreover, in step S16 in Embodiment 1, a signal instructing pairing with wireless controller 20 is transmitted to luminaires 1 through k from setting device 30, but this example is not limiting; a signal instructing pairing with luminaires 1 through k may be transmitted to wireless controller 20 from setting device 30. In such cases, the transmission power for the signal instructing pairing may increased before being transmitted to wireless controller 20.

Moreover, in Embodiment 1, the target range for the total number of addresses is exemplified as being a range of from 1 to k, but the target range may be of from 2 to k. In such cases, when performing the pairing setting operation for the last luminaire among luminaires 1 through n, the target range for the total number of addresses may be changed to a range of from 1 to k.

What is claimed is:

1. A lighting system, comprising:
   a plurality of luminaires;
   a wireless controller that wirelessly communicates with the plurality of luminaires; and
   a setting device that wirelessly communicates with the plurality of luminaires,
   wherein the plurality of luminaires have mutually different addresses,
   the setting device includes:
      a communication unit configured to transmit an address request signal to the plurality of luminaires at a first transmission power level and receiving one or more addresses from one or more of the plurality of luminaires; and
      a control unit configured to determine whether a total number of the one or more addresses transmitted from the one or more of the plurality of luminaires in response to the address request signal is within a target range which is stored in advance in the setting device, the target range being used for determining whether a paring operation is performed or not for the one or more of the plurality of luminaires which transmitted the one or more addresses, and
   the control unit is configured to:
      instruct the communication unit to transmit a new address request signal at a second transmission power level different from the first transmission power level when the total number of the one or more addresses is outside the target range, and execute pairing between the wireless controller and the one or more of the plurality of luminaires that responded to the address request signal when the total number of the one or more addresses is within the target range.

2. The lighting system according to claim 1, wherein when the total number of the one or more addresses is greater than an upper limit of the target range, the control unit is configured to set the second transmission power level lower than the first transmission power level and instruct transmission of the new address request signal.

3. The lighting system according to claim 1, wherein when the total number of the one or more addresses is within the target range, the control unit is configured to, after receiving an input associating a location of the one or more of the plurality of luminaires that responded to the address request signal with the one or more addresses of the one or more of the plurality of luminaires, instruct, via the communication unit, the one or more of the plurality of luminaires to pair with the wireless controller.

4. The lighting system according to claim 1, wherein when instructing transmission of the address request signal for a first time to a luminaire for which the pairing has not been executed among the plurality of luminaires, the control unit is configured to instruct the communication unit to transmit the address request signal at a transmission power level of a predetermined rated value.

5. The lighting system according to claim 1, wherein when instructing transmission of the address request signal for a first time to a luminaire for which the pairing has not been executed among the plurality of luminaires, the control unit is configured to instruct the communication unit to transmit the address request signal at a previously used transmission power level that resulted in the total number of the one or more addresses being within the target range.

6. The lighting system according to claim 1, wherein when instructing transmission of the address request signal for a first time to a luminaire for which the pairing has not been executed among the plurality of luminaires, the control unit is configured to instruct the communication unit to transmit the address request signal at a transmission power level calculated by inputting current layout information on the lighting system into an equation stored in advance and expressing a relation between layout information on the lighting system and a transmission power level required to bring the total number of the one or more addresses within the target range.

7. The lighting system according to claim 6, wherein the control unit updates the equation based on a record of
(i) the layout information on the lighting system input and (ii) the transmission power level that resulted in the total number of the one or more addresses being within the target range.

8. The lighting system according to claim 1, wherein when instructing transmission of the address request signal for a first time to a luminaire for which the pairing has not been executed among the plurality of luminaires, the control unit is configured to instruct the communication unit to transmit the address request signal at a transmission power level calculated by inputting a target number desired for the total number of the one or more addresses into an equation stored in advance and expressing a relation between a target number for the total number of the one or more addresses and a transmission power level required to equate the total number of the one or more addresses to the target number.

9. The lighting system according to claim 8, wherein the control unit updates the equation based on a record of (i) the target number input and (ii) the transmission power level that resulted in the total number of the one or more addresses being within the target range.

10. The lighting system according to claim 1, wherein each of the plurality of luminaires includes a communication unit configured to receive the address request signal and a control unit configured to determine whether a signal strength of the address request signal is greater than or equal to a threshold value, and when the signal strength is greater than or equal to the threshold value, the control unit in the luminaire is configured to transmit the address to the setting device via the communication unit in the luminaire.

11. A setting device that executes pairing of a plurality of luminaires having mutually different addresses with a wireless controller, the setting device comprising:

a communication unit configured to wirelessly transmit an address request signal to the plurality of luminaires at a first transmission power level and receiving one or more addresses from one or more of the plurality of luminaires; and a control unit configured to determine whether a total number of the one or more addresses transmitted from one or more of the plurality of luminaires in response to receiving the address request signal is within a target range which is stored in advance in the setting device, the target range being used for determining whether a paring operation is performed or not for the one or more of the plurality of luminaires which transmitted the one or more addresses, wherein the control unit is configured to:
instruct the communication unit to transmit a new address request signal at a second transmission power level different from the first transmission power level when the total number of the addresses is outside the target range, and execute pairing between the wireless controller and the one or more of the plurality of luminaires that responded to the address request signal when the total number of the addresses is within the target range.

12. The setting device according to claim 11, wherein when the total number of the one or more addresses is beyond the target range, the control unit is configured to set the second transmission power level lower than the first transmission power level and instruct transmission of the address request signal.

13. A pairing method for a lighting system including a plurality of luminaires having mutually different addresses, a wireless controller that wirelessly communicates with the plurality of luminaires, and a setting device that wirelessly communicates with the plurality of luminaires, the pairing method comprising:

transmitting, by the setting device, an address request signal to the plurality of luminaires at a first transmission power level;

transmitting, by one or more of the plurality of luminaires in response to receiving the address request signal, one or more addresses of the one or more of the plurality of luminaires to the setting device;

determining, by the setting device, whether a total number of the one or more addresses transmitted from the one or more of the plurality of luminaires in response to the address request signal is within a target range which is stored in advance in the setting device, the target range being used for determining whether a paring operation is performed or not for the one or more of the plurality of luminaires which transmitted the one or more addresses;

when the total number of the one or more addresses transmitted is outside a target range, transmitting, by the setting device, a new address request signal at a second transmission power level different from the first transmission power level, and when the total number of the one or more addresses transmitted is within the target range, instructing, by the setting device, the one or more of the plurality of luminaires that responded to the address request signal to pair with the wireless controller; and executing, by the one or more of the plurality of luminaires instructed to pair with the wireless controller, the pairing with the wireless controller.

14. The pairing method according to claim 13, wherein when the total number of the one or more addresses is beyond the target range, the transmitting involves setting the second transmission power level lower than the first transmission power level and transmitting the address request signal by the setting device.

15. The pairing method according to claim 13, wherein when the total number of the one or more addresses is within the target range, the instructing is performed after receiving an input associating a location of the one or more of the plurality of luminaires that responded to the address request signal with the one or more addresses of the one or more of the plurality of luminaires.

* * * * *